United States Patent [19]

Altmann et al.

[11] Patent Number: 4,680,091
[45] Date of Patent: Jul. 14, 1987

[54] APPARATUS FOR THE CONTINUOUS VACUUM CLEANING OF OIL

[75] Inventors: Josef Altmann, Domazlice; Bohuslav Beran, Ledce, both of Czechoslovakia

[73] Assignee: ZLEHIT pri BAN, Sofia, Bulgaria

[21] Appl. No.: 843,063

[22] Filed: Mar. 24, 1986

[30] Foreign Application Priority Data

Mar. 26, 1985 [CS] Czechoslovakia ............... 2137-85

[51] Int. Cl.$^4$ ............................................. B01D 3/02
[52] U.S. Cl. ................................... 202/205; 196/114; 202/206
[58] Field of Search ............... 55/36, 38, 40, 41, 42, 55/43, 52, 55, 57, 159, 182, 189, 190, 199; 202/205, 206; 210/800, 804, 808, 150, 151, 180, 664, 181, 767, 718; 196/99, 98, 100, 102, 132, 114, 138, 141

[56] References Cited

U.S. PATENT DOCUMENTS 3,318,448  5/1967  Fryer ................................. 210/180

FOREIGN PATENT DOCUMENTS

114190  6/1969  Denmark ........................... 202/181

Primary Examiner—Frank Sever

[57] ABSTRACT

Apparatus for the continuous vacuum cleaning of oil operating on the principle of continuous alteration of a compression, and of a separating cycle, by utilizing a combined action of quasistationary processes instigated by reduced pressure and of non stationary processes generated by a hydrodynamic cavitator. Due to a repeated circulation of the oil filling through a non-stationary and a quasistationary separating process, a high purity of oil, which is subsequently forced back into the container of the oil system, or of an electric transformer, respectively, is achieved and simultaneously a safe removal of contaminations.

6 Claims, 3 Drawing Figures

APPARATUS FOR THE CONTINUOUS VACUUM CLEANING OF OIL

BACKGROUND OF THE INVENTION

This invention relates to an apparatus for continuous vacuum oil cleaning connected in parallel to an oil system, which apparatus is particularly suitable for continuous cleaning of oil fillings of high voltage transformers.

Known solutions for protection of oil fillings, particularly of oil fillings of electric transformers using oil as a dielectric and as cooling liquid are, in most cases, limited to a passive protection against contaminations from the surrounding atmosphere, combined in case of a dangerous increase of contaminating admixtures in the oil with a once performed cleaning process, achieving by external cleaning at a standstill of the machine. The typically passive protections of oil fillings act, in most cases, as a kind of isobaric closure, allowing a free passage of the surrounding air above the free level of oil in a conservator of the machine, while collecting selectively, the air moisture from the surrounding atmosphere, which air is supposed to be the main contaminanate of the dielectric liquid.

Most of known technical solutions by means of which the contamination of oil fillings of transformers by air moisture is limited, are based on freezing of water vapors in an air stream, flowing from the surrounding atmosphere to a conservator of the machine at a reduced load of this machine. The absorption capability of silicagel filters is also analogically utilized, which filters are similarly as in the preceding case introduced between the conservator of the transformer and the surrounding atmosphere.

The hermetization of transformers can be also included to passive protection methods of oil fillings. By a hermetic separation of the free oil surface in the conservator, from the surrounding atmosphere by an elastic diaphragm, or by a bag or by a thermodynamic closure, it is possible to limit very efficiently not only the infiltration of air moisture into the protective filling, but also prevents the contamination of oil by atmospheric oxygen.

Active methods of protection of oil fillings of electric transformers differ from the mentioned passive methods primarily in that the external contamination, process, due to the surrounding atmosphere, is not only slowed down by these processes, but they also enable an active removal of contaminations dissolved in oil so that the condition of the oil filling is not only maintained for a long time, but can also be improved.

Most known solutions of this kind are continuous methods of oil cleaning at substantially reduced pressure. These apparatus, generally called vacuum oil cleaners, can be mutually differentiated primarily by the method of which the required vacuum, causing subsequently the release of contaminating admixtures from the oil, is generated.

All mentioned methods for protection of oil fillings and their corresponding apparatus have some drawbacks. The main drawback of the passive protection of oil fillings, by means of freezing devices or by silicagel absorbers, is that they only enable to reduce the relative moisture of the air medium above the free oil level in the conservator. They prevent, thus, to a high degree, the saturation of oil by water, but do not influence the saturation of oil by gases contained in the air and also not by gases generated within the oil filling of the transformer in the course of operation conditions. The hermetization of oil in the conservator, on the other hand, prevents any access of air and water vapors to the oil filling, but prevents at the same time any, escape of gases generated in the oil filling of a transformer due to creation of so-called hot spots. The danger of a substantial saturation of oil by gas is particularly sufficiently known on high voltage electric transformers. It shows particularly, in case of a quick increase of the load of the transformer with a following increase of temperature of its oil filling, where due to a following oversaturation of the oil medium by gases, dissolved gases are released in the shape of bubbles. The creation of gas bubbles causes a substantial reduction of the electric strength in the oil dielectric similarly as an increased moisture content. In more favorable cases, the transformer is cut off from the mains by action of a gas relay, whereas in extreme situations, an electric breakdown within the machine occurs with substantial damage not only on the proper transformer, but also on the whole distribution system connected thereto. A lasting increased content of gases dissolved in the transformer oil has a major influence on the long time reliability of the machine. An already slightly increased content of oxygen in combination with moisture of the oil, cna cause of a quick aging both of the oil filling and of the insulating oil cellulose system.

The active methods of cleaning oil fillings in electric transformers have so far shown respective arrangements that are connected continuously to the machine which is in operation, and are capable to limit the occurrence, or at least of the frequency, of these mentioned failures. Their drawback is their complicated design, a high number of mobile parts, and a rather low specific performance compared with their size, input and weight. All of these mentioned drawbacks are overcome by the present apparatus for the continuous vacuum cleaning of oil.

The relevant part of these apparatuses apply solely to a quasistationary cleaning process on the basis of a forced diffusion generated due to a reduction of the overall pressure above the levels, surfaces, films or drops of the cleaned oil. The intensity of the process of forced diffusion on the boundary liquid gas is determined by concentration gradients, but at quasistationary processes, the contaminating gases and vapors cannot be released quickly enough even from a substantially oversaturated liquid medium either without sufficient occurrence of nuclear cores required for creation of bubbles or of suitably shaped hollows, where the bubbles can grow on the basis of surface forces. At rather viscous liquids, an example of which can be for instance a relatively cold transformer oil, the capillary forces onthe surface of spherical bubbles act against their growth and slow down a free release of bubbles through the surface of the liquid. The same type of capillary forces causes an increase of pressure within small drops of the cleaned liquid. So far a solution of increasing the overall interphase surface by atomizing has been used, but these concentration gradients reduce the interphase surface drop-vacuum, and again make impossible a quick diffusion of gases and vapors from the cleaned medium.

A certain increase of the separating effect of the above mentioned apparatuses is usually obtained by thin layers of the cleaned medium which flows down along suitably arranged built-in elements or inserts of vacuum chambers. This quantitative way for increasing the separating effect leads to an increase of the size of vacuum chambers. A once performed cleaning cycle is therefore also applied at the major part of apparatus where the time of retention of oil, in vacuum chambers, is limited to a relatively short time. If we consider the rather slow speed of separation of gas and vapors at the process of forced diffusion, it is impossible to avoid at the majority of actual apparatus that, the cleaned liquid, taken off from vacuum spaces, remains always oversaturated, i.e. insufficiently relieved of dissolved contaminants. In case of higher residual contaminations, of the taken-off liquid, it is also impossible to avoid another negative condition represented by cavitation of pumps, by means of which the cleaned liquid passes from vacuum spaces to spaces with normal pressure in the container of the transformer. However, not only the pump is exposed to cavitation processes. Bubbles released due to cavitation are together with oil forced back into the oil filling of the transformer. This again endangers the machine by electric disruption discharges. Another frequently used method for increasing the separating effect of the apparatus is an increase of temperature of the treated oil. Due to reduction of capillary forces, corresponding to the reduction of the viscosity of the liquid due to the increase of the temperature, it is possible to achieve a higher separating intensity. However, in the case of an increase of the oil temperature to 80° to 100° C. a rather quick degradation of natural inhibition agents of aging of the oil medium is experienced. In case this method is applied, the thus treated oil has to be on the output of the apparatus artifically inhibited.

SUMMARY OF THE INVENTION

It is an object of this invention to reduce, to a high degree, the above mentioned drawbacks of prior known apparatuses for continuous vacuum cleaning of oil. A further object of this invention is to provide an improved apparatus which would operate reliably and which would always secure an oil free of dangerous contaminants without the requirement of a standstill of the machine for which the oil is cleaned. The apparatus according to this invention operates on the principle of continuous alteration of pressure and separation cycles, and comprises a vacuum cleaner with an inlet filter, a hydrodynamic cavitator, a separator, a main chamber with an accumulation extension, pick-up means of the oil level controlled by an electric motor, an auxiliary chamber with a condenser, a retention chamber, a collecting chamber and a pump. A set of conduits, valves, and orifice plates connects the different elements of the vacuum cleaner and the cleaner with the oil system of the respective apparatus. The inlet of the vacuum cleaner is connected by a supply conduit to a connecting conduit between a container of the oil system and a conservator of this system. The output of the vacuum cleaner is connected by way of a discharge conduit to the conduit of oil coolers. An inlet filter is connected to the inlet of the vacuum cleaner which is furthermore connected by way of a return valve with a reverse bypass. This reverse bypass is connected both to a pressure sleeve of a pump provided with a non return valve of this pump, the discharge sleeve of which is connected to the bottom of the main chamber. It is furthermore connected to the input of a hydrodynamic cavitator, the output of which is connected by a transfer conduit to the input of a separator which is also connected over at least one overflow channel to the upper part of an auxiliary chamber provided also with a condenser and is also connected over a connecting channel to a central channel of the main chamber. An equalizing conduit of the auxiliary chamber is connected to the connecting channel, the condenser of the auxiliary chamber is connected to the upper part of the main chamber. A gas conduit and a discharge conduit are connected to the accumulation extension of the main chamber. These conduits are connected with the upper part of a collecting chamber which is in addition provided with a return conduit, into which a non return valve of this collecting chamber is inserted, and which is introduced into the auxiliary chamber. The reverse bypass is furthermore connected with a transfer bend provided with a throttle orifice plate and connected to the upper part of a retention chamber, from which a siphon connected to the output of the vacuum chamber is extending. The reverse bypass is connected to a jet of the hydrodynamic cavitator situated in the inlet chamber of the cavitator, to which a cylindrical chamber is joined, connected to a diffuser. This diffuser is connected to a transfer conduit leading to the inlet of the separator. A central channel is situated in the vertical axis of the main chamber and is provided with a set of separating disks. The equalizing conduit is situated so as to extend vertically into the auxiliary chamber, the bottom of which chamber is provided with a desludging conduit with a desludging valve. A floater is arranged in the upper pick-up device of the oil level and equally in the lower pick-up device of the oil level, each of which floaters is fixed to a bottom of bellows by a twin arm lever, the other end of which lever is connected to a set screw of an upper and lower microswitches, respectively. One contact of the lower microswitch is connected over a feeding line to the third phase of electric current of a feeding line. Its second contact is connected both to one contact of the upper microswitch and also to a connecting contact of a contactor. The second contact of the upper microswitch is connected to the winding of the coil and to a holding contact of the contactor whereas the opposite end of the coil is connected to the zero phase of electric current of the feeding line.

The advantage of the apparatus for continuous vacuum cleaning of transformer oil is primarily an increase of the degree of release and separation of unwelcomed contaminating admixtures which are dissolved in the oil supplied to this apparatus from the electric transformer. The cleaning process which proceeds in the apparatus according to this invention is accomplished in principal at equal or lower temperatures than the temperature of oil in the proper transformer and is conforming with a full maintenance of natural aging inhibitors of the oil filling. Simultaneously, the apparatus and performance of the cleaning process secures a reliable functioning of the proper cleaning apparatus and excludes any possibility of a repeated contamination of the already cleaned oil by separated gaseous or vaporous admixtures. This is accomplished by this invention by utilizing a combined action of quasistationary processes instigated by reduced pressure, the so-called operation vacuum, and of non stationary processes generated by a hydrodynamic cavitator. Due to a repeated circulation of the oil filling, through a non stationary and quasistationary separating process, a high purity of oil is achieved. This oil is then forced back into the container of the electric transformer, and simultaneously a safe removal of separated contaminating admixtures beyond the apparatus. Continuous measurings in the course of operation, a following and registering of the amount of separated contamination agents from the transformer oil within a selected time interval, can also be advantageously utilized for judging the conditions of the electric transformer. A sudden deviation from daily registered values of separated gas indicates the occurrence of some negative process proceeding within the transformer, or with heat disintegration of the transformer oil with corresponding generation of gases. The high cleanliness of oil, which is supplied by the pump from vacuum spaces to the proper transformer, effectively reduces cavitation effects in this pump, increasing the reliability and long life of this single mobile part of the apparatus. Thus, the possibility is avoided that gases and vapors, by cavitation of the pump, are introduced back into the cleaned oil filling of the transformer. Due to utilizing the rather intensive, nonstationary separation of gases and vapors from the oil in the hydrodynamic cavitator, a substantial reduction of the required size of the apparatus is achieved. Due to the high intensity of separation processes an advantageous monoblock apparatus can be used which enables a simple mounting, accessibility and repairs of the vacuum cleaner without shutting down the performance of the transformer.

BRIEF DESCRIPTION OF THE DRAWINGS

A preferred embodiment of the apparatus for vacuum cleaning of transformer oil is shown in the attached drawings where.

DETAILED DESCRIPTION OF A PREFERRED EMBODIMENT

Figure 1:
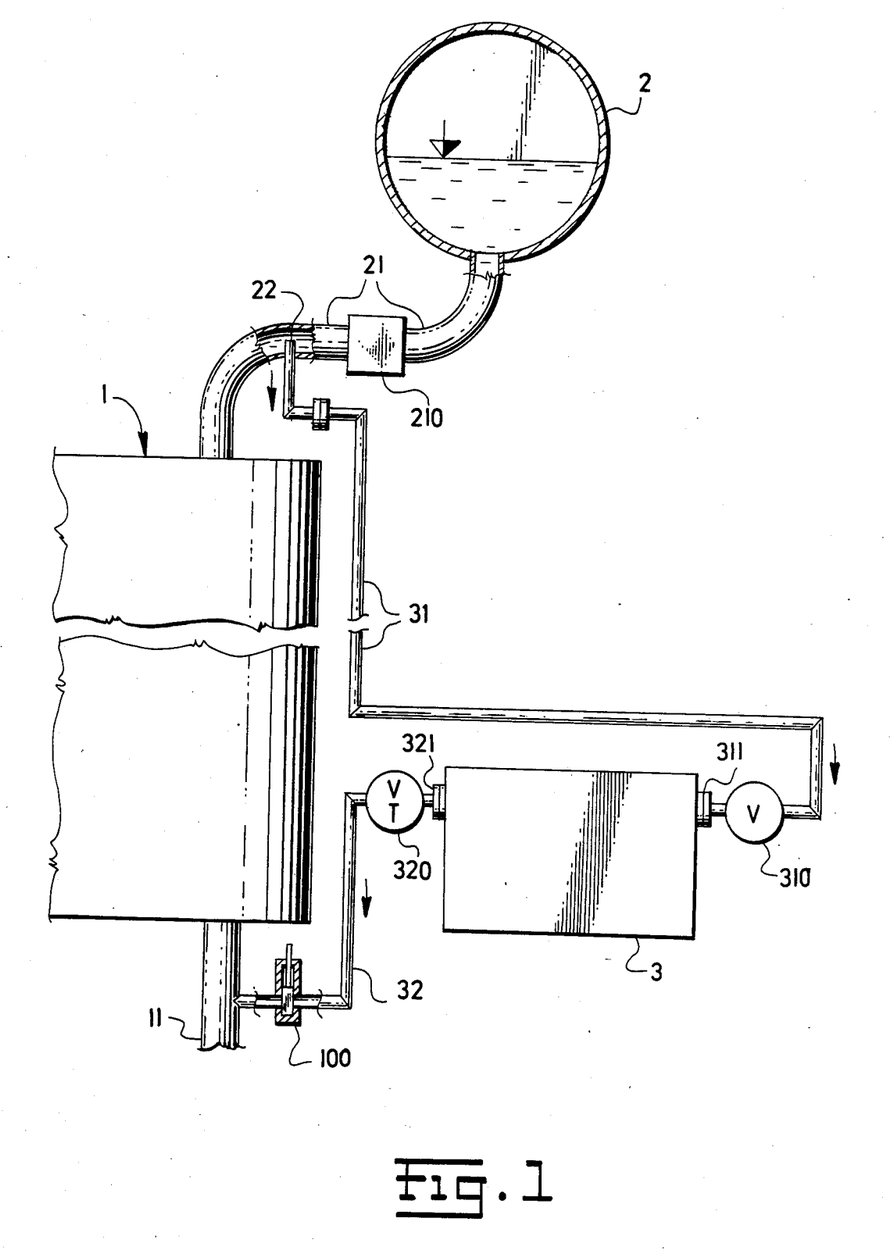
FIG. 1 indicates the overall arrangement of an electric transformer and of a monoblock of a vacuum cleaner.
Figure 2:
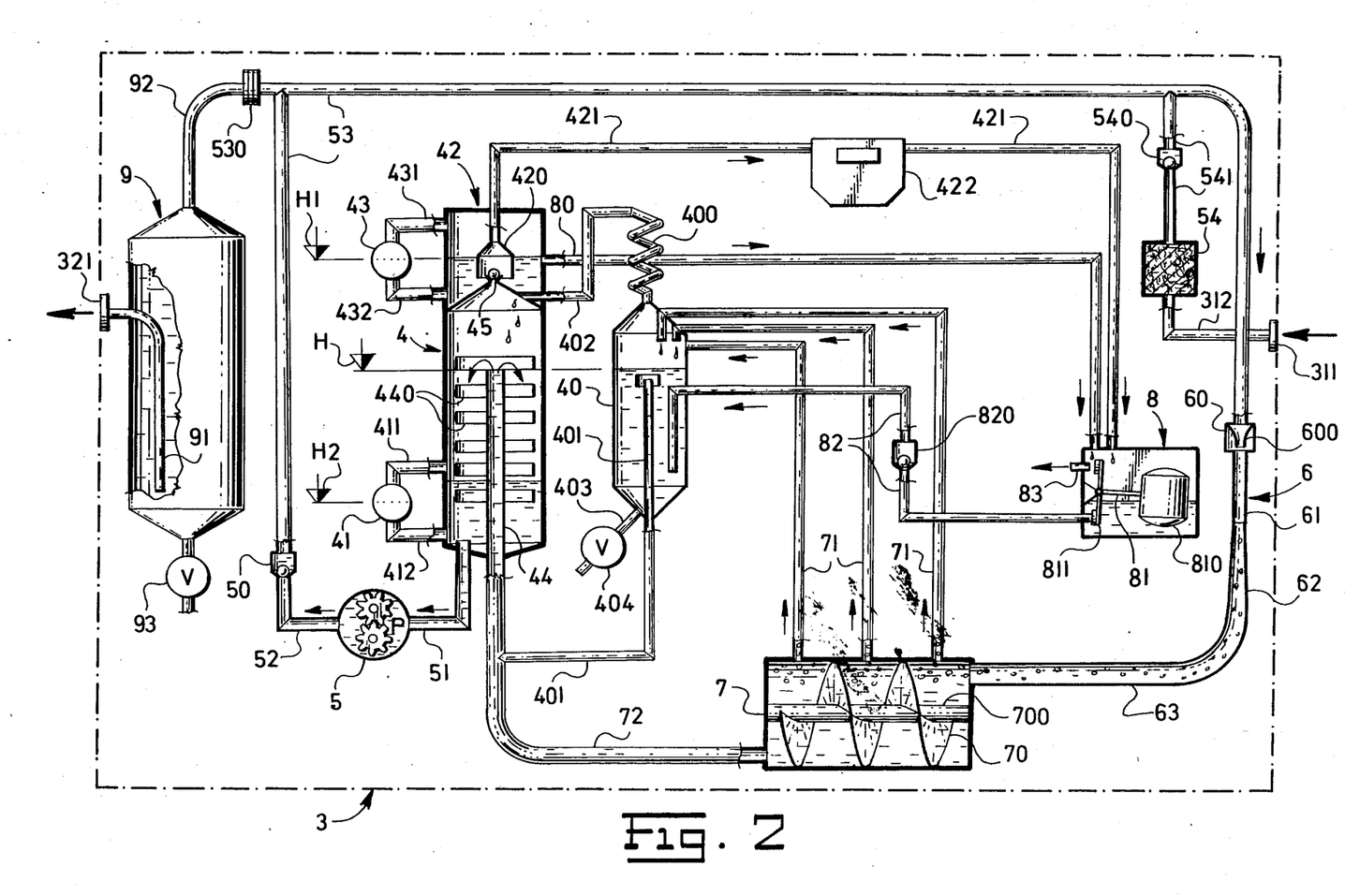
FIG. 2 shows the hydraulic interconnection of the proper vacuum cleaner and FIG. 3 the electric interconnection.

With reference to FIG. 1, the examplary apparatus for continuous vacuum cleaning of oil comprises a connecting conduit 21 starting from the upper part of a container 1 of an oil system, (in the case given of an electric transformer), and terminating into the lower part of conservator 2, whereby a gas relay 210 is inserted in this conduit. A take-off sleeve 22, the upper termination of which is situated in the axis of the connectng conduit 21 in front of the gas relay 210, is connected with the upper part of a supply conduit 31, in the lower part of which an inlet valve 310 is inserted. This supply conduit 31 is, by its lower part, connected to an input flange 311 situated on the right side of a vacuum cleaner 3. A discharge conduit 32 with inserted regulating valve 320 is connected to the outlet flange 321 at the left side of the vacuum cleaner 3. The discharge conduit 32 is, in its lower part, provided with a discharge slide valve 100 which is also connected to a conduit 11 of a not shown oil cooler in the lower part of a container 1 of the oil system, in the case given of an electric transformer. The monoblock of the vacuum cleaner 3 (the diagram of its hydraulic interconnection is shown in FIG. 2) comprises a hydrodynamic cavitator 6, a worm separator 7, a main chamber 4, an auxiliary chamber 40 and a gear pump 5, whereby said elements are mutually interconnected so as to create together, with a reverse bypass 53, a closed hydraulic loop. An inlet filter 54 of the vacuum cleaner 3 is connected, both by an inlet sleeve 312 with an inlet flange 311 to the supply conduit 31, (shown only in FIG. 1) and also by the conduit 541 of the inlet filter 54 with inserted non-return valve 540, with the right part of the reverse bypass 53 which is firmly connected to the upper part of the hydrodynamic cavitator 6. An inlet jet 600 of the hydrodynamic cavitator 6 is inserted into its inlet chamber 60 coaxially with a cylindrical chamber 61 extending therefrom. The lower outlet of the cylindrical chamber 61, of the hydrodynamic cavitator 6, forms thereby by its conical enlargement, a diffuser 62 connected by a connecting conduit 63 with the cylindrical mantle of the worm separator 7. A worm 70, wound on a supporting tube 700 is inserted into a cylindrical mantle of the worm separator 7, whereby each winding of the worm is at the top provided with an overflow channel 71 by means of which the upper part of the worm separator 7 is connected with the upper part of the auxiliary chamber 40. The left side of the worm separator 7 is connected by a connecting conduit 72, into which an equalizing conduit 4 terminates, with the lower part of the main chamber 4, where this connecting conduit passes over into a central channel 44 which extends upwards along the axis of the main chamber 4. The central channel 44 terminates thereby in the upper part of said chamber 4 at the indicated height of the overflow level H. The upper outlet of the central channel 44, provided along its whole length, with perpendicularly attached separation disks 440, is arranged so that the upper end of the equalizing conduit 401 is in the auxiliary chamber 40 below the overflow level H, and all terminations of overflow channels 71 in the upper part of the auxiliary chamber 40 are above this level. The main chamber 4 of the vacuum cleaner 3 is thereby at its lower part, connected by an upper sleeve 411 and by a lower sleeve 412 with a lower pick-up device 41 of the oil level, at the height of a lower pick-up level H2. At the highest place of the upper conical top of the main chamber 4 of the vacuum cleaner 3, a non-return valve 45, connecting the internal space of the main chamber 4 with the internal space of an accumulation extension 42, is arranged as a direct upper continution of the cylindrical mantle of the main chamber 4, and is provided at the highest place of the conical top of the main chamber 4 of the vacuum cleaner 3. A siphon closure 420, connected by a gas conduit 421 with an inserted gas meter 422, is arranged above the non-return valve 45 in the accumulation extension 42, and terminates in the upper part of a collecting chamber 8. An upper pick-up device 43 is connected at the left side of the accumulation extension 42 by an upper sleeve 431 and by a lower sleeve 432 at the height of the upper pick-up level H1. A discharge conduit 80 is brought out at the right side of the accumulation extension 42 below the height of the upper pick-up level H1, said discharge conduit 80 connecting the accumulation extension 42 with the collecting chamber 8.

From this collecting chamber 8, which is provided with a twin-way closure 81 controlled by a float 810, a return conduit 82 with inserted non-return valve 820, terminating into the lower part of the auxiliary chamber 40, is brought out at the lower part of the collecting chamber 8. The twin-way closure 81 and the float 810 close in their lower position, indicated in FIG. 2, the lower outlet of the return conduit 82 from the collecting chamber 8, and simultaneously fully open the gas outlet 83, which in this case connects the internal space of the collecting chamber 8 freely with the surrounding atmosphere. The gear pump 5, connected by way of a suction sleeve 51 with the lower part of the main chamber 4, is by way of a pressure sleeve 52 connected to a non-return valve 50 of the gear pump 5, and to the reverse bypass 53, terminating into the hydrodynamic cavitator 6. A hydraulic resistance, materialized in this case by a throttling orifice plate 530, is inserted into the left branch of the reverse bypass 53 and a transfer bend 92 terminates into the conical top of the retention chamber 9, which is analogically as the main chamber 4 and the auxiliary chamber 40 realized as a container consisting of a cylindrical mantle with a conical top and bottom, and is connected to the take-off flange 321 of the vacuum cleaner 3 by means of a siphon 91 terminating above the conical bottom of the retention chamber 9. The conical bottom of the retention chamber 9 is provided with a discharge valve 93.

Figure 3:
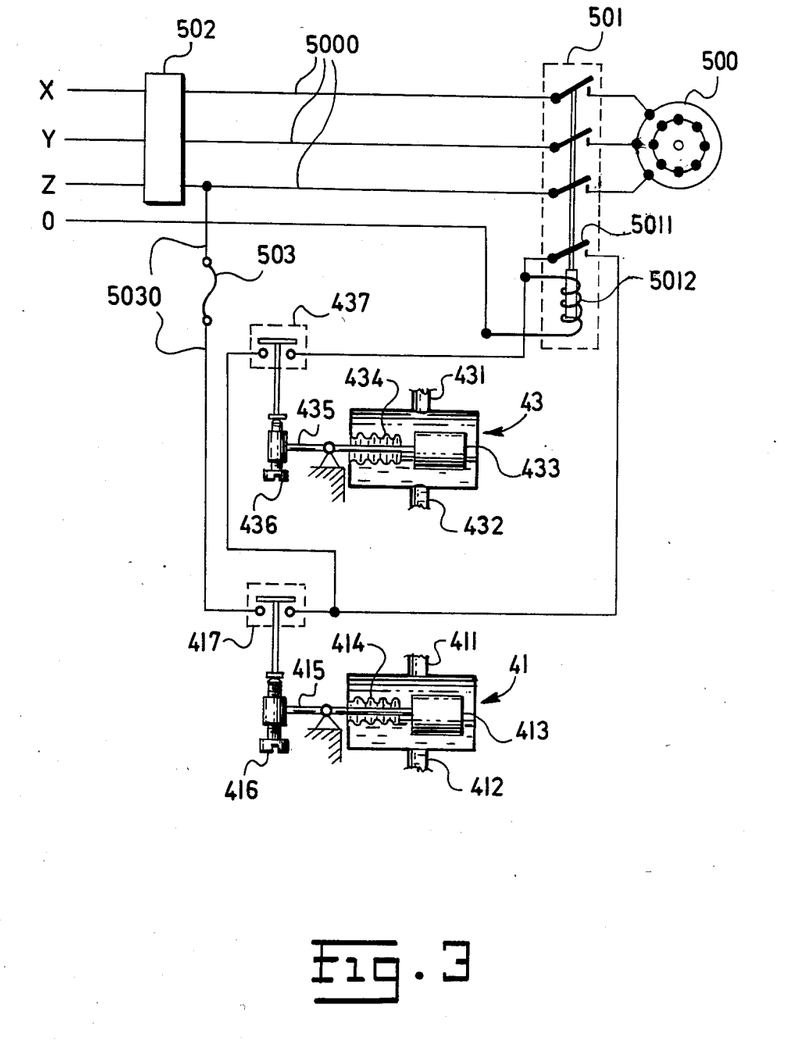

An example of an electrical circuit arrangement of the vacuum cleaner 3 is shown in FIG. 3. This electrical circuit comprises an electric motor 500, a three phase contactor 501, a pick-up device 43 of the upper level, a pick-up device 41 of the lower level, two microswitches 437, 417, apparatus fuses 503 and a three phase overcurrent circuit breaker 502 combined with a circuit breaker. The three phase electric motor 500 is connected over three contacts of a three phase contactor 501 by way of a transmission line 5000 with a three phase overcurrent circuit breaker 502 which is connected to a not shown supply source of three phase current. From the transmission line 5000 between the overcurrent circuit breaker 502 and the three phase contactor 501; for instance, from phase Z a feeding line 5030 branches off, which feeds over an apparatus fuse 503 a microswitch 417 of the pick-up device 41 of the lower oil level. The pick-up device 41 of the lower oil level comprises a cylindrical mantle, into which an upper sleeve 411 engages from the top and a lower sleeve 417 from the bottom. A bellow 414 forms a part of the front wall of the pick-up device 41 of the lower oil level, through the right closed side of which bellow a two arm lever 415 passes, with a float 413 fixed to its right arm. A set screw 416 is connected to the left arm of the twin arm lever 415, on which set screw 416 the control shaft of the microswitch 417 of the pick-up device 41 of the lower oil level is resting. The pick-up device 43 of the upper oil level with the second microswitch 437 is arranged analogically. The microswitch 417 of the pick-up device 41 of the lower oil level, to the left contact of which the feeding line 5030 is connected, is by its right contact, connected with the left contact of the second microswitch 437, and is also simultaneously connected with the right side of a holding contact 5011 of a three phase contactor 501, whereby from the left side of the holding contact 5011, a connection is accomplished both with the coil 5012 of the three phase contactor 501 and also with the right contact of the second microswitch 437.

The operation of the apparatus for continuous vacuum cleaning of oil proceeds sequentially and consists in an uninterrupted sequence of a compression and separation cycle of the vacuum cleaner 3. In the course of the compression cycle, the vacuum cleaner 3 is filled by contaminated oil which is over the take-off sleeve 22 taken off from the connecting conduit 21 between the conservator 2 and the electric transformer 1 and passes over the supply conduit 31 to the inlet of the vacuum cleaner 3 (see FIG. 1). In the course of the separating cycle the cleaned oil is forced from the vacuum cleaner 3 and passes over the discharge conduit 32 back into the lower part of the container 1 of the oil system, in the case given of an electric transformer.

When describing the operating of the vacuum cleaner, we shall start from a condition of the apparatus corresponding to the separation cycle which is indicated in FIG. 2. At this condition, the oil level in the main chamber 4 is close above the height of the lower pick-up level H2 and the nominal operational vacuum is achieved in the space above the level in the main chamber 4 and in the auxiliary chamber 40. In case of a lowering of the height of the oil level below the lower pick-up level H2, the pick-up device 41 of the lower pick-up level is actuated and the three phase electric motor 500 of the gear pump 5 is cut off. By cutting off the gear pump 5, the vacuum cleaner 3 passes from the separation to the compression cycle. The pressure in the reverse bypass 53 drops to about the height of the hydrostatic pressure corresponding to the vertical distance of the vacuum cleaner 3 from the oil level in the conservator 2, the non-return valve 540 is opened in the filter conduit 541 and contaminated oil flows from the supply conduit 32 by way of the inlet sleeve 312 into the inlet filter 54 of the vacuum cleaner 3. The oil, deprived of coarse contaminations, enters over the conduit 541 of the inlet filter 54 into the right branch of the reverse bypass 53 and flows therefrom into the hydrodynamic cavitator 6. The beam of the oil medium, which flows from the jet 600 into the inlet chamber 60 of the hydrodynamic cavitator 6, is gradually disintegrate due to the pressure difference between the pressure in the reverse bypass 53 and the dynamically obtained vacuum in the inlet chamber 60 on its path along the axis of the inlet chamber 60 and of the cylindrical chamber 61. Due to the high, dynamically obtained vacuum and the substantial turbulence in the beam itself, up to now dissolved contaminants are released from the oversaturated oil in the shape of microscopic vapor-gas bubbles.

Due to disintegration of the oil beam and due to the entraining of vapor-gas bubbles of contaminants, which have been separated from the beam into the space of the inlet chamber 60, along the axis of this chamber in direction to the cylindrical chamber 61, a rather high vacuum is maintained in the space of the inlet chamber 60 due to this process. In the course of the transition effect of the ring jump, by which the axial beam of the now already two phase medium is brought to the passage in the full cross section of the cylindrical chamber 61, the bubbles of separated contaminating admixtures are simultaneously compressed and concentrated to larger bubble aggregations and after a further compression of the two phase mixture by the diffuser 62 to a counterpressure corresponding to the operation vacuum in the main chamber 4 and the auxiliary chamber 40, they are leaving the hydrodynamic cavitator 6. The mixture of bubble aggregations and oil enters by way of the connecting conduit 63 to the right side of the worm separator 7. Due to forcing the mixture of oil and of bubbles through the worm separator 7, the two phase medium passes over to a slow helical movement, whereby a separating process is generated, the result of which is a sufficiently quick separation of oil from contaminating admixtures which are now concentrated in the bubbles. Due to the wall effect on the surface of the worm 70 and of the cylindrical mantle of the worm separator 7, and due to the proper elevating force of the bubbles and not in the least due to the double vortex which is generated by the movement of the mixture along the helical path, the bubbles are gradually separated from the flowing mixture and are concentrating at the highest place of the mantle of the worm separator 7. The mixture of bubbles and oil with a substantially increased content of the vapor-gas fraction, is removed from each winding of the worm 70 over overflow channels 71 into the upper part of the auxiliary chamber 40. In the course of the separating cycle, the thus precleaned oil is removed from the left lower part of the worm separator 7 over the connecting channel 72 into the central channel 44 and falls over its upper top over a cascade, formed by a set of separating disks 440 fixed perpendicularly to said channel 44. The filling of the main chamber 4, by precleaned oil from the worm separator 7, is also influenced by supply of oil from the auxiliary chamber 40. The concentrated mixture of contaminants and oil passes from the worm separator 7 to the auxiliary chamber 40, due to the hydrostatic difference between the oil column with a higher density in the central channel 44 and between the liquid column with a lower density, in the overflow channels 71. A separation of bubble aggregates from oil proceeds in the auxiliary chamber 40 and the free vapor gas mixture is collecting above the surface in the auxiliary chamber 40 wherefrom it passes over the condenser 400 and the transfer sleeve 402 above the raising oil level in the main chamber 4. The separated oil is removed from the auxiliary chamber 40 in the course of the first phase of the compression cycle over the equalizing conduit 401 to the connecting channel 72 and furthermore over the central channel 44 into the main chamber 4, whereas sludge released by floatation in the worm separator 7 is due to gravity separation collected on the conical bottom of the auxiliary chamber 40. Due to increase of the height of the level in the main chamber 4, the separated contaminants are gradually compressed. This process proceeds up to a moment where the height of the level in the main chamber 4 exceeds the height of the overflow level H, whereupon oil removed from the worm separator 7 starts to fill also the auxiliary chamber 40 due to return flow over the equalizing conduit 401. Due to proceeding compression of the vapor gas mixture above, the levels in both mentioned chambers 4 and 40, the compressed gas starts moistening, the steam from the vapor gas mixture starts to condensate on the cool surface of the condenser 400 and of the auxiliary chamber 40. The condensate flows down in the shape of drops and collects on the bottom of the auxiliary chamber 40, wherefrom it is together with the sludge, if need be, is taken-off over the desludging conduit 403 and the desludging valve 404 beyond the vacuum cleaner 3. Due to the perpendicular termination of the equalizing conduit 401 into the connecting channel 72 where the major part of oil flows through, the level in the auxiliary chamber 40 rises substantially slower than in the main chamber 4. Due to the thus realized venturi effect and the unequally quick increase of heights of the levels in the main chamber 4 and the auxiliary chamber 40, the compressed vapor gas mixture overflows from the main chamber 4 into the auxiliary chamber 40. Due to passage at this compression phase already of moist gas through the condenser 400, a part of the moisture is separated in the shape of drops which trickle towards the bottom of the auxiliary chamber 40. At the moment the gas vapor mixture is compressed above the atmospheric pressure, the main chamber 4 is already fully filled by oil, and after opening of the nonreturn valve 45 of the main chamber 4, the vapor-gas mixture flows to the accumulation extension 42. The vapor gas mixture is, in this phase of the compression cycle, supplied below the non-return valve 45 of the main chamber 4 over the equalizing sleeve 402, and the condenser 400, and due to the mentioned opposite flow of moist gas, part of its water content is deposed on the walls of the condenser 400. The increase of height of oil levels in the main chamber 4, and the auxiliary chamber 40, proceeds until all vapors and gases are expelled from both chambers 4 and 40, whereafter oil starts again to flow into the accumulation extension 42. The expelled gas and steam are brought below the siphon closure 420 of the accumulation extension 42 and this gas and steam flows over the gas meter 422 from the accumulation extension 42 into the collecting chamber 8. The filling of the accumulation extension 42 by oil proceeds until the moment where the height of the oil level in the accumulation extension 42, exceeds the height of the upper switching level H1. In case the height of the upper switching level H1 is surpassed, the upper pick-up device 43 of the oil level is actuated and by switching on the gear pump 5, the vacuum cleaner 3 passes over to the separation cycle. Due to sucking-off of oil from the completely filled main chamber 4 first non return valve 45 of the main chamber 4 is closed and the overall pressure above the created oil level in the main chamber 4 and the auxiliary chamber 40 quickly decreases up the pressure level of the operation vacuum. Due to a simultaneous reduction of the counter pressure and of the feeding pressure of the hydrodynamic cavitator 6, this element is brought to operation with an increased level of turbulent processes and of a dynamically obtained vacuum. The pressure increase in the reverse bypass 53, which is proportional to the hydraulic pressure of the gear pump 5 and to hydraulic resistances of the throttling orifice plate 530 and of the jet 600 of the hydrodynamic cavitator 6, causes a closure of the non-return valve 540 in the conduit 541 of the inlet filter 54. Thus, the vacuum cleaner 3 is, in the course of the separation cycle cut off from the supply of contaminated oil from the container 1 of the oil system, or of the electric transformer, respectively. In the course of the separation cycle of the vacuum cleaner 3 only precleaned oil from the preceding compression cycle is flowing in the closed hydraulic loop and this oil is repeatedly subject to non-stationary and quasistationary cleaning processes. Due to the increased effect of separation processes, which are otherwise identical with the already described processes of the compression cycle, the degree of cleanliness of oil is in the course of the separation cycle furthermore increased, and as part of the oil medium is forced from the left side of the reverse bypass 53, in accordance with the hydraulic resistance of the throttling orifice plate 530 into the retention chamber 9 and therefrom via the siphon 91 to the take-off conduit 32, it flows therefrom to the lower part of the container 1 of the oil system or of the electric transformer respectively.

Due to the forced removal of oil from the vacuum cleaner 3, the height of the oil level in the main chamber 4 is gradually lowering up to the height of the lower switching level H2, caused the pick-up device 41 of the lower switching level to be actuated, and by cutting off the gear pump 5 of the vacuum cleaner 3, the compression cycle is again established.

The automatic operation of the apparatus for continuous vacuum cleaning of transformer oil represented by an uninterrupted sequence of a separation and compression cycle of the vacuum cleaner 3 is enabled by a simple electric circuit arrangement indicated in FIG. 3. In case of a complete inundation of the lower pick-up device 41 of the oil level, and due to increase of the oil level at the pick-up device 43 of the oil level above the height of the upper switching level H1, that is in case of a condition corresponding to a change of the vacuum cleaner 3 from a compression to a separation cycle, the floaters 431, 433 of both pick-up devices 41, 43 of the oil level are raised to a position where a closing of contacts of both microswitches 417,437 is accomplished. Thus, the coil 5012 of the three phase contactor 501 is actuated, which simultaneously closes the control contacts and the holding contact 5011 of the three phase contactor 501. By cutting in the three phase monitor 500, driving the gear pump 5, the vacuum cleaner 3 is transferred to the separation cycle. As the accumulation extension 42 is emptied over the outlet conduit 80, over which the oil flows into the collecting chamber 8, the height of the level in the accumulation extension 42 and in the upper pickup device 43 of the oil level, which is connected therewith, is lowered up to below the height of the upper switching level H1. A lowering below this height and the corresponding drop of the floater 433, of the upper pick-up device 43 of the oil level, causes a disconnection of the upper microswitch 437. The condition of the described electrical circuit arrangement does not change at this moment, as the coil 5012 of the three phase contactor 501 is in this case fed from the closed holding contact 5011. The transfer of the vacuum cleaner 3, from the separation to the compression cycle, is accomplished only at a lowering of the height of the oil level in the main cleaner 4, and an adequate lowering of the height of the oil level in the pick-up device 41 of the lower oil level below the the height of the lower switching level H2. Due to a reduction of the height of oil below this level, and due to a drop of the floater 413 of the lower pick-up device 41 of the oil level, the microswitch 437 is disconnected and as thus the whole current is cut off from voltage. The three phase electric motor 500 is also simultaneously cut off by the three phase contactor 501. The autonomous monoblock arrangement of the vacuum cleaner 3 which enables its easy installation in the lower part of an electric transformer and also secures an easy access to this arrangement and an easy possibility of repair without putting out of action the container 1 of the oil system or of the electric transformer respectively, is secured in the examplary apparatus according to this invention by the collecting chamber 8. The oil substantially contaminated by gases and water, which oil is at the end of a compression cycle forced by way of the non-return valve 45 of the main chamber 4 into the accumulation extension 42, passes by way of the outlet conduit 80 into the collecting chamber 8, whereby its amount is currently measured by the gas meter 422, and is inserted into the gas conduit 421. By supply of oil and by the corresponding increase of the height of the level in the collecting chamber 8, the floater 810 of the twin position closure 81 is raised and oil is sucked off by way of the return conduit 82 over the non-return valve 820 back into the vacuum of the auxiliary chamber 40. The nominal middle position of the twin way closure 81, corresponding to oil supply from the accumulation extension 42 in the course of the current automatic operation of the vacuum cleaner 3, enables a simultaneous sucking-off of oil back into the hydrodynamic circuit of the apparatus, whereby separated contaminants escape over the open gas outlet 83 freely into the atmosphere. In case of an increased oil supply into the collecting chamber 8, which can, for instance, correspond to a condition when the vacuum cleaner 3 is out of operation and the apparatus is filled without control by gravity from the container 1 of the oil system or of they electric transformer, respectively, the twin way closure 81 is switched over to the upper position, and by closing the gas outlets 83, the whole unit of the vacuum cleaner 3 is hermetically sealed against the surrounding space.

An important element which secures the reliability of the vacuum cleaner 3 against possible carrying along of vapor gas bubbles in the stream of cleaned oil back into the container 1 of the oil system or of the electric transformer, respectively, is the retention chamber 9 of the vacuum cleaner 3. Particularly, at the starting of the vacuum cleaner 3, where the apparatus is filled with contaminated oil from the container 1 of the oil system, the retention chamber 9 limits the possibility of a reverse taking along the vapor gas bubbles. So far the release of contaminants has been caused due to the passage through the throttling orifice plate 530, or due to cavitation in the gear pump 5. The retention chamber 9 is therefore placed so that in the course of the separation cycle, where a mixture of bubbles and of oil can flow through the throttling orifice plate 530, a concentration of vapor gas contaminants could flow into the upper part of its conical top. In the course of the following compression cycle, the bubbles are due to the reverse passage of oil from the discharge conduit 32 from the electric transformer 1 forced over the throttling orifice plate 530 into the reverse bypass 53 and in the course of mentioned separating processes are removed beyond the vacuum cleaner 3.

While there has been described a particular embodiment of the invention, it will be apparent to those skilled in the art that variations may be made thereto without departing from the spirit of the invention and the scope of the appended claims.

We claim:

1. Apparatus for continuous vacuum cleaning of oil comprising
   means designed for utilizing the combined action of quasistationary conditions generated by operation vacuum, and of non stationary conditions generated by a hydrodynamic cavitator sufficient to substantially increase the degree of release and separation of contaminants in oil from an electric transformer including
   a container of an oil system connected to
   a conservator by way of a connecting conduit which is connected to
   a supply conduit which connects the connecting conduit of said container of an oil system and said conservator with
   a vacuum cleaner which has an inlet filter arranged before
   a hydrodynamic cavitator which leads to
   a separator and then to
   a main chamber with
   an accumulation extension, which has attached a circuit arrangement comprising
   pick-up means for the oil level controlled by
   an attached electric motor, said accumulation extension is also connected to
   an auxiliary chamber with a condenser and said accumulation extension is further connected to
   a retention chamber,
   a collecting chamber, a pump,
an oil cooler by
conduits and
valves, and a throttling means and the outlet of said vacuum cleaner is finally connected over
a discharge conduit and then to
an outlet conduit to oil coolers.

2. Apparatus as in claim 1, wherein the said inlet filter is connected to the inlet of the said vacuum cleaner, and said inlet filter is also connected over
a non-return valve with
a reverse bypass, said reverse bypass is connected both to
a pressure sleeve of said pump provided with
a non-return valve of said pump, the suction sleeve of said pump is connected to the bottom of the main chamber, the said reverse bypass being also connected to the input of the said hydrodynamic cavitator, the output of which is connected over
a connecting conduit to the input of said separator, the upper part of which is connected by
at least one overflow channel to the upper part of the said auxiliary chamber provided also with
a condenser and also over
a connecting channel to
a central channel of the said main chamber, whereby
an equalizing conduit of the said auxiliary chamber is connected to the connecting channel between the said separator and the said main chamber, the condenser of the auxiliary chamber is connected to the upper part of the said main chamber, into
an accumulation extension of the said main chamber a gas conduit and an outlet conduit are terminating, which conduits are connected to the upper part of the collecting chamber, which is also provided with
a return conduit, into which
a non-return valve of this said collecting chamber is inserted and which said return conduit is connected to the said auxiliary chamber, and the said reverse bypass is also provided with
a transfer bend with
a throttling orifice plate and is connected to the upper part of
a retention chamber, from which
a siphon is extending, connected to the outlet of the said vacuum cleaner.

3. Apparatus as in claim 2, wherein the said hydrodynamic cavitator comprises
an inlet chamber,
a jet,
a cylindrical chamber, and
a diffuser, the reverse bypass connected to said jet which is situated in said inlet chamber, said inlet chamber passing over into
a cylindrical chamber and furthermore into
a diffuser which is connected over
a transfer conduit to the said separator.

4. Apparatus as in claim 2, wherein
a central channel of the said main chamber is situated in the axis of the main chamber,
a set of separating disks is provided on said central channel,
an equalizing conduit situated in the axis of the auxiliary chamber and
a desludging conduit, provided with
a desludging valve is connected to the bottom of the said auxiliary chamber.

5. Apparatus as in claim 2, wherein floaters are situated within
pick-up devices of an upper and lower oil level in the said main chamber, each floater fixed to a part of
a bellow by
a two arm lever, and the other end of said two arm lever connected to
a set screws of an upper and lower
microswitch, respectively.

6. Apparatus as in claim 5, wherein one contact of the lower microswitch is connected over
a feeding line to a third phase of electric current of
a transmission line,
a second contact of said lower microswitch is connected both to one contact of the upper microswitch and also to
a connecting contact of a contactor, and
a second contact of the upper microswitch is connected to the winding of a coil of a contactor and to a holding contact of contactor, whereas the other end of said winding of the contactor is connected to the zero phase of electric current of the transmission line.

* * * * *

UNITED STATES PATENT AND TRADEMARK OFFICE
CERTIFICATE OF CORRECTION

PATENT NO. : 4,680,091
DATED : July 14, 1987
INVENTOR(S) : Josef ALTMANN et al

It is certified that error appears in the above-identified patent and that said Letters Patent are hereby corrected as shown below:

Item [73] should read as follows:

Assignee : Skoda, koncernovy podnik
Plzen, Czechoslovakia

Signed and Sealed this

Twentieth Day of October, 1987

Attest:

DONALD J. QUIGG

Attesting Officer

Commissioner of Patents and Trademarks